United States Patent
Alexandersson et al.

(10) Patent No.: US 10,307,966 B2
(45) Date of Patent: Jun. 4, 2019

(54) INDUCTION SEALING DEVICE AND METHOD FOR MANUFACTURING AN INDUCTION SEALING DEVICE

(71) Applicant: TETRA LAVAL HOLDINGS & FINANCE S.A., Pully (CH)

(72) Inventors: Martin Alexandersson, Furulund (SE); Karl Israelsson, Malmo (SE); Daniel Sandberg, Flyinge (SE); Karl-Axel Johansson, Loddekopinge (SE); Vincenzo De Salvo, Malmo (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 372 days.

(21) Appl. No.: 15/021,521

(22) PCT Filed: Aug. 22, 2014

(86) PCT No.: PCT/EP2014/067917
§ 371 (c)(1),
(2) Date: Mar. 11, 2016

(87) PCT Pub. No.: WO2015/036222
PCT Pub. Date: Mar. 19, 2015

(65) Prior Publication Data
US 2016/0221250 A1    Aug. 4, 2016

(30) Foreign Application Priority Data
Sep. 13, 2013 (SE) ...................... 1351056

(51) Int. Cl.
*B29C 65/36* (2006.01)
*B65B 51/22* (2006.01)
(Continued)

(52) U.S. Cl.
CPC ........ *B29C 65/3668* (2013.01); *B29C 65/368* (2013.01); *B29C 65/3656* (2013.01);
(Continued)

(58) Field of Classification Search
CPC ............ B29C 65/3668; B29C 65/3656; B29C 65/368; B29C 65/7451
See application file for complete search history.

(56) References Cited

U.S. PATENT DOCUMENTS 4,704,509 A * 11/1987 Hilmersson ............. B29C 65/18
219/633
5,250,140 A * 10/1993 Hayashi ............ B29C 66/81427
156/380.5
(Continued)

FOREIGN PATENT DOCUMENTS

CN          1489540 A       4/2004
DE  10 2012 021 091 A1    5/2013
(Continued)

OTHER PUBLICATIONS

Machine Translation of DE102012021091 A1 (Year: 2013).*
(Continued)

*Primary Examiner* — Daniel McNally
(74) *Attorney, Agent, or Firm* — Buchanan Ingersoll & Rooney PC

(57) ABSTRACT

The present invention relates to an induction sealing device for heat sealing packaging material for producing sealed packages. The present invention also relates to a method of manufacturing such an induction sealing device. The device comprises at least one inductor made of an alloy comprising silver and copper.

19 Claims, 2 Drawing Sheets

(51) Int. Cl.
  *B29C 65/74* (2006.01)
  *B29C 65/00* (2006.01)
  *B65B 61/06* (2006.01)
  *C22C 5/08* (2006.01)

(52) U.S. Cl.
  CPC ...... *B29C 65/7451* (2013.01); *B29C 66/1122* (2013.01); *B29C 66/3462* (2013.01); *B29C 66/3472* (2013.01); *B29C 66/4312* (2013.01); *B29C 66/7234* (2013.01); *B29C 66/72321* (2013.01); *B29C 66/72341* (2013.01); *B29C 66/81427* (2013.01); *B29C 66/849* (2013.01); *B65B 51/227* (2013.01); *B65B 61/06* (2013.01); *C22C 5/08* (2013.01); *B29C 66/71* (2013.01); *B29C 66/8122* (2013.01)

(56) References Cited

U.S. PATENT DOCUMENTS

| | | | |
|---|---|---|---|
| 5,968,399 A | 10/1999 | Selberg | |
| 6,104,272 A * | 8/2000 | Yamamoto | H01F 17/03 336/200 |
| 7,348,525 B2 * | 3/2008 | Kupfer | B29C 65/3656 219/633 |
| 2004/0060928 A1 | 4/2004 | Balla | |
| 2008/0314433 A1 * | 12/2008 | Luch | H01L 31/0475 136/244 |

FOREIGN PATENT DOCUMENTS

| | | | |
|---|---|---|---|
| DE | 102012021091 A1 * | 5/2013 | ............ H05B 6/101 |
| EP | 0 484 998 A1 | 5/1992 | |
| JP | H04-154564 A | 5/1992 | |
| JP | H11-135328 A | 5/1999 | |
| RU | 2 348 838 C2 | 3/2009 | |
| WO | WO 02/060759 A1 | 8/2002 | |

OTHER PUBLICATIONS

International Search Report (PCT/ISA/210) dated Sep. 30, 2014, by the European Patent Office as the International Searching Authority for International Application No. PCT/EP2014/067917.

Written Opinion (PCT/ISA/237) dated Sep. 30, 2014, by the European Patent Office as the International Searching Authority for International Application No. PCT/EP2014/067917.

Office Action (Notification of Reason for Refusal) dated Jun. 25, 2018, by the Japanese Patent Office in corresponding Japanese Patent Application No. 2016-541863, and an English Transition of the Office Action. (6 pages).

* cited by examiner

INDUCTION SEALING DEVICE AND METHOD FOR MANUFACTURING AN INDUCTION SEALING DEVICE

TECHNICAL FIELD

The present invention relates to an induction sealing device for heat sealing packaging material for producing sealed packages of pourable food products. The present invention also relates to a method of manufacturing such an induction sealing device.

BACKGROUND OF THE INVENTION

Many pourable food products, such as fruit juice, still drinks, milk, wine, tomato sauce, etc., packed and sold in packages made of a paper- or carton-based packaging material exist. A typical example of this type of package is the parallelepipedic package known as Tetra Brik®, which is made by folding and sealing a web of laminated packaging material. The described packages are produced in fully automatic packaging machines such as for example Tetra Pak A3 packaging machine applying the form-fill-seal technology. Optionally the packages are of the type where a pre-manufactured sheet of the laminated packaging material are formed and filled, a typical example being marketed as Tetra Recart®

The packaging material in which the layer of barrier material comprises an electrically conductive material, for example an aluminium layer, is normally heat sealed by a so-called induction heat-sealing process, in which, eddy currents are induced in the aluminium layer, resulting in a localized heating and thus melting the heat-sealable polymeric material locally.

Conventionally the packages are heat-sealed using induction heat sealing inducing localized heating in a conductive material, e.g. the aluminium layer. Typically the sealing device comprises an inductor made of copper (Cu).

Typically, the induction sealing device, and therefore also the inductor, is exposed to high temperatures, high pressures and hydrogen peroxide in the packaging machine. This combination creates an aggressive environment which in certain applications causes rapid corrosion and wear of the inductor. Consequently, the sealing devices have to be replaced regularly, each replacement causing a stop in the production of packages.

SUMMARY OF THE INVENTION

In view of the above, one object of the present invention is therefore to prolong the lifetime of the sealing device by providing a sealing device more resistant to wear and corrosion. One object of the present invention is to provide an inductor having improved properties such as for example increased life time, which for example when subjected to harsh conditions such as those present in automatic packaging machines. One object of the present invention is to provide an inductor which has the desired properties when it comes to conductivity and yet a long life time when subjected to the environment in automatic packaging machines. Typically the environment may wear the sealing device, mainly due to its mechanism of action during the sealing of packages.

Above objects are achieved by an induction sealing device for heat sealing packaging material for producing sealed packages. The sealing device comprises at least one inductor made of an alloy comprising silver (Ag) and copper (Cu).

The invention is also achieved by a method of manufacturing an induction sealing device (10) for heat sealing packaging material for producing sealed packages, by providing an induction sealing device (10) comprising at least one inductor (12), made of an alloy comprising silver (Ag) and copper (Cu).

BRIEF DESCRIPTION OF DRAWINGS

The above, as well as additional objectives, features and advantages of the present invention, will be better understood through the following illustrative and non-limiting detailed description of an exemplary embodiment of the present invention, reference being made to the appended schematic drawings.

DETAILED DESCRIPTION OF EMBODIMENTS

Figure 1:
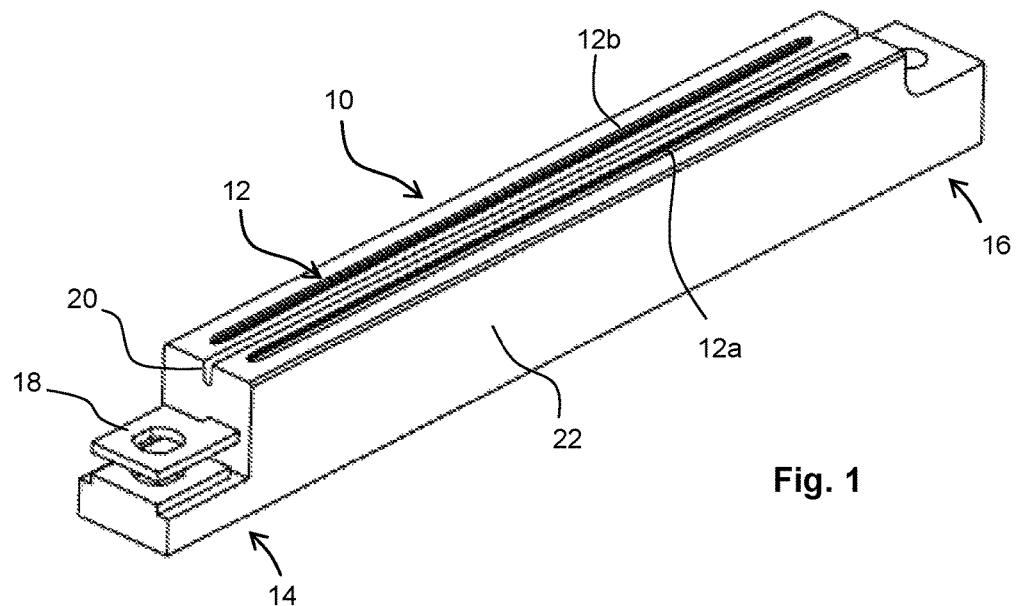
FIG. 1 is a perspective view of an induction sealing device according to the invention.

Many pourable food products, such as fruit juice, still drinks, milk, wine, tomato sauce, etc., are sold in packages made of a paper- or carton-based packaging material. A typical example of this type of package is the parallelepipedic package known as Tetra Brik®, which is made by folding and sealing a web of laminated packaging material.

A typical packaging material for that type of package has a structure substantially comprising a base layer of fibrous material, e.g. paper or carton, and a number of layers of heat-sealable polymeric material, e.g. polyethylene films, covering both sides of the base layer. In the case of aseptic packages, for which storage and distribution are made in ambient temperature, the packaging material also typically comprises a layer of gas- and light-barrier material, e.g. aluminium foil, which is superimposed on a layer of plastic material, and is in turn covered with another layer of heat-sealable polymeric material forming the inner face of the package eventually contacting the food product.

In production of aseptic packages the packaging material is sterilized in the packaging machine. One way of sterilizing the packaging material is to apply a chemical sterilizing agent such as a hydrogen peroxide solution which, once sterilization is completed, is removed from the surfaces of the packaging material, e.g. evaporated by heating. Another way of sterilizing the packaging material is to irradiate it by means of electron beams. After sterilization the web of packaging material is maintained in a closed, sterile environment, and is folded and sealed longitudinally to form a vertical tube. The tube is fed continuously in a first vertical direction, is filled with the sterilized or sterile-processed food product (form-fill-seal technology), and is gripped at equally spaced cross sections by pairs of jaws. More specifically, the pairs of jaws act cyclically and successively on the tube, and heat seal the packaging material of the tube to form a continuous row of cushion-shaped packages connected to one another by respective transverse sealing zones, extending in a second direction which is perpendicular to said first direction. The cushion-shaped packages are separated by cutting in the relative transverse sealing zones. The packages are then conveyed to a final folding station where they are folded mechanically into the finished parallelepipedic shape.

For other types of packages, for example the packages known as Tetra Recart®, the packaging material may be provided as sheets. Each sheet is formed into a flat sleeve in a packaging converting line, by sealing two overlapping ends of the sheet. In the packaging machine the flat sleeve is erected and one end of the sleeve is transversally sealed. The food product is filled into the partly formed package, and in a subsequent station the still open end of the package is transversally sealed to form a closed package. After final forming the packages are retorted to make them aseptic.

The present invention can be applied to any of the above mentioned packaging types.

In induction heat sealing, the sealing device substantially comprises an inductor powered by a high-frequency current generator. The inductor is made of electrically conductive material and the generated electromagnetic field interacts with the aluminium layer in the packaging material to induce eddy currents and heat the plastic to the necessary sealing temperature. According to the present invention the inductor is made of inductor made of an alloy. In one embodiment of the present invention the alloy is silver (Ag) alloy. The inductor may also be referred to as the induction coil. In one embodiment of the present invention the alloy is an alloy comprising Ag, Cu and one or more other elements.

In one embodiment of the present invention the one or more other element is a metal selected from the group consisting of Li, Be, Na, Mg, Al, K, Ca, Sc, Ti, V, Cr, Mn, Fe, Co, Ni, Zn, Ga, Rb, Sr, Y, Zr, Nb, Mo, Tc, Ru, Rh, Pd, Cd, In, Sn, Cs, Ba, Hf, Ta, W, Re, Os, Ir, Pt, Au, Hg, Tl, Pb, Bi, Fr, Ra, Rf, Db, Sg, Bh, Hs, Mt, Ds, Rg, Cn, Uut, Uuq, Uup, and Uuh (wherein the letters are corresponding to the elements in the periodic table of elements).

In one embodiment of the present invention the one or more other element is a metal selected from the group consisting of nickel (Ni), iron (Fe), gold (Au), chromium (Cr), beryllium (Be), zirconium (Zr) and platinum (Pt).

In one embodiment of the present invention the alloy comprises at least 10 weight % Ag, such as at least 20 weight %, such as at least 30 weight %, such as at least 40 weight %, such as at least 50 weight %, such as at least 55 weight %, such as at least 60 weight %, such as at least 65 weight %, such as at least 70 weight %, such as at least 75 weight %, such as at least 80 weight %, such as at least 85 weight %, such as at least 90 weight %, such as at least 95 weight %, such as at least 97 weight %, such as at least 99 weight %.

In one embodiment of the present invention the alloy comprises at least 1 weight % Cu, such as at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 weight %.

In one embodiment the alloy comprises at least 0.1 weight % of one or more other element, such as 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0 weight %.

In some embodiments of the present invention the alloy comprises at least 10 weight % Ag, such as at least 20 weight %, such as at least 30 weight %, such as at least 40 weight %, such as at least 50 weight %, such as at least 55 weight %, such as at least 60 weight %, such as at least 65 weight %, such as at least 70 weight %, such as at least 75 weight %, such as at least 80 weight %, such as at least 85 weight %, such as at least 90 weight %, such as at least 95 weight %, such as at least 97 weight %, such as at least 99 weight %; and at least 1 weight % Cu, such as at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 weight %; and at least 0.1 weight %, such as 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0 weight % of one or more other element.

In some embodiments of the present invention the alloy comprises at least 10 weight % Ag, such as at least 20 weight %, such as at least 30 weight %, such as at least 40 weight %, such as at least 50 weight %, such as at least 55 weight %, such as at least 60 weight %, such as at least 65 weight %, such as at least 70 weight %, such as at least 75 weight %, such as at least 80 weight %, such as at least 85 weight %, such as at least 90 weight %, such as at least 95 weight %, such as at least 97 weight %, such as at least 99 weight %; and at least 1 weight % Cu, such as at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 weight %, and at least 0.1 weight % such as 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0 weight %, of one or more other element selected from group consisting of Li, Be, Na, Mg, Al, K, Ca, Sc, Ti, V, Cr, Mn, Fe, Co, Ni, Zn, Ga, Rb, Sr, Y, Zr, Nb, Mo, Tc, Ru, Rh, Pd, Cd, In, Sn, Cs, Ba, Hf, Ta, W, Re, Os, Ir, Pt, Au, Hg, Tl, Pb, Bi, Fr, Ra, Rf, Db, Sg, Bh, Hs, Mt, Ds, Rg, Cn, Uut, Uuq, Uup, and Uuh.

In one embodiment of the present invention the alloy comprises between 50-97 weight % Ag, and 3-50 weight % Cu.

In one embodiment of the present invention the alloy consist of between 50-97 weight % Ag, and 2.9-50 weight % Cu and at least 0.1 weight % of one or more of the other elements (as listed above).

In one embodiment of the present invention the alloy consist of between 50-97 weight % Ag, and 2.9-50 weight % Cu and at least 0.1 weight % of one or more of the other elements selected from the group consisting of nickel (Ni), iron (Fe) and gold (Au). Optionally traces (low amounts) of additional elements may be present however any such element are considered impurities and are of no material importance to the invention and will not affect the benefits brought about by the present invention, namely the long lifetime and the improved resistance to wear and to harsh conditions. Benefits of an induction coil of an alloy as described herein above are for example wear resistance and/or corrosion resistance.

In one embodiment of the present invention the alloy comprises 72-78 weight % Ag, 21-27 weight % Cu and 0.5-2 weight % Ni. In one embodiment of the present invention the alloy comprises about 74 weight % Ag, about 24 weight % Cu and about 1 weight % Ni.

The sealing device is typically fitted to a first jaw. The other jaw, known as the anvil, comprises a counter-sealing element fitted with pressure pads made of elastomeric material. The anvil cooperates with the sealing device to heat seal the tube or sleeve along a relative transverse sealing zone. More specifically, the sealing device locally melts the two layers of heat-sealable polymeric material gripped between the jaws.

Furthermore, for cutting packages from a tube, the anvil may be arranged with a cutting element. In particular, the cutting element may slide towards and away from the sealing device of the sealing jaw along a third direction orthogonal to first and second direction such that it cuts the continuous row of packages into individual packages in accordance with the previous description.

A known inductor sealing device for use in both cases substantially comprises an inductor having one or more sealing surfaces. The inductor is partly encapsulated in a supporting body having at least the sealing surfaces exposed on an outer surface of the supporting body, for cooperation with the packaging material during the formation of packages. The power connections are also exposed outside the supporting body. One or more inserts made of magnetic flux-concentrating material, e.g. a composite material comprising ferrite, may be arranged inside the supporting body, close to the inductor, for guiding the electromagnetic field.

Each sealing surface may comprises a protruding ridge which is intended to cooperate with the packaging material and increase the pressure thereon, so causing the fusion of the melted plastic material of the packaging material in the sealing area.

Although the present invention as described above further more specific embodiments are described herein below.

FIG. 1 shows an induction sealing device 10. It comprises an inductor 12, i.e. an induction coil, extending rectilinearly from a first end 14 of the sealing device 10 to an opposite end 16. It has a longitudinal extension between the first and the second ends 14, 16. Electrical connectors (not shown) are adapted to be connected to power connections 18 of the inductor 12 for allowing electrical current to flow through the inductor 12, which electrical current is supplied by an external power supply (not shown).

Depending on the type of jaw system that the induction sealing device 10 will be fitted into cooling means (not shown) may be provided within the sealing device 10. One way of cooling may be to provide one or more cooling liquid ducts inside the inductor 12.

Figure 2:
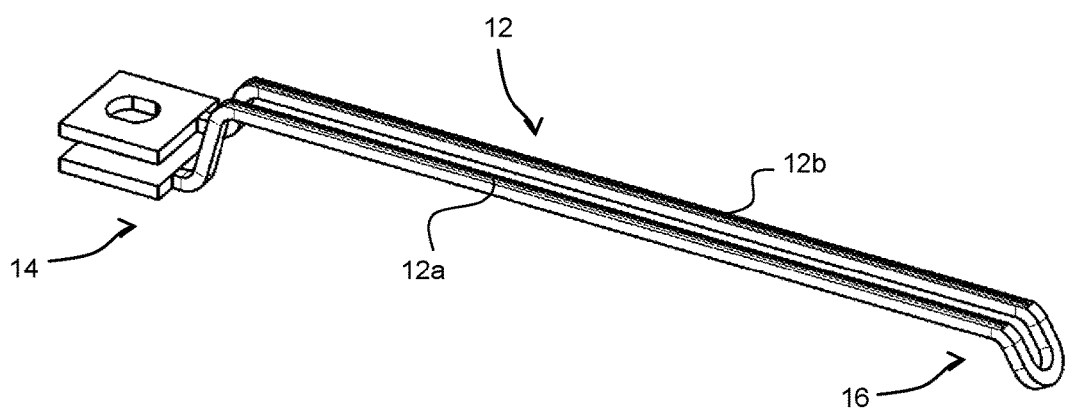
FIG. 2 is a perspective view of an inductor of the induction sealing device of FIG. 1.

The inductor 12, also seen in FIG. 2, is provided with two sealing surfaces 12a, 12b. The sealing surfaces are provided in parallel and spaced apart. The inductor 12 extends from the first end 14 to the opposite end 16 along a rectilinear path thus forming the first sealing surface 12a, where it changes direction and returns back to the first end 14, thus forming the second sealing surface 12b parallel to the first. By having such loop type arrangement of the inductor 12, a single sealing device may provide two adjacent seals simultaneously. Alternatively, the inductor may be of the single seal type having only one sealing surface. Alternatively, the inductor may be of a double loop type having more than two sealing surfaces (typically four sealing surfaces).

As seen in FIG. 1 the inductor 12 is partly encapsulated in a supporting body 22. The sealing surfaces 12a, 12b are exposed on an outer, upper surface 24 of the supporting body 22 for cooperation with the packaging material during the formation of packages. The supporting body 22 is typically made of a polymeric material, preferably glass-fiber reinforced polymeric material, for example polyphenylene sulfide (PPS). The power connections 18 of the inductor 12 are also exposed outside the supporting body 22. A groove 20 is provided between the sealing surfaces 12a, 12b of the inductor 12 for allowing a cutting tool to run in the groove 20 whereby a package may be separated from the tube in an efficient manner.

Figure 3:
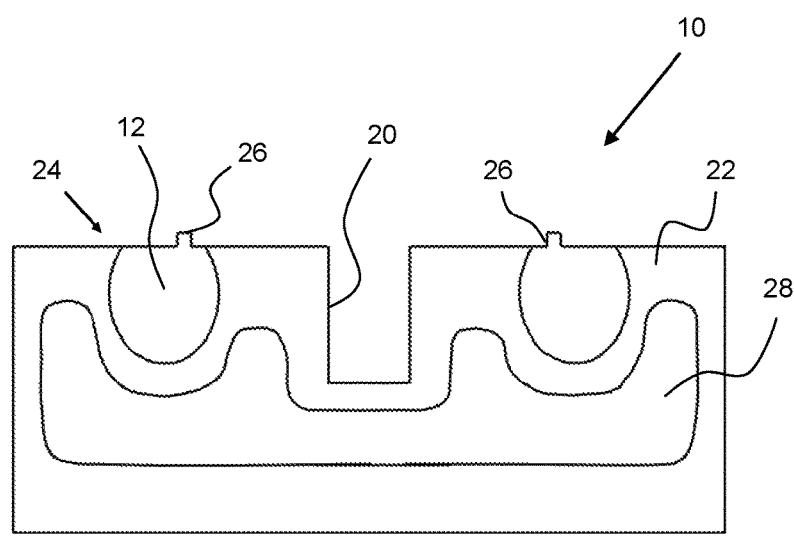
FIG. 3 is a cross-sectional side view of the induction sealing device of FIG. 1.

Now turning to FIG. 3, a cross-sectional view of the induction sealing device 10 is shown. The cross sectional view is in a plane directed orthogonal to a longitudinal extension of the sealing device 10, which is readily understood from comparing with e.g. FIG. 1. The longitudinal extension being the extension between the first end 14 and the second end 16. As can be seen the upper surface 24 is being substantially planar to provide a close contact with the packaging material along the entire length of the induction sealing device 10. The upper surface 24 extends over the two sealing surfaces 12a and 12b of the inductor 12 and is disrupted at the groove 20. Each sealing surface 12a and 12b of the inductor 12 further includes a protruding ridge 26 extending linearly along the entire length of each sealing surface 12a and 12b. The protruding ridge 26 is intended to cooperate with the packaging material to ensure full contact between the induction sealing device 10 and the packaging material, and increase the pressure thereon, so causing fusion of the melted plastic material of the packaging material in the sealing area. Each ridge 26 is positioned slightly offset the center of the respective sealing surface 12a, 12b seen in the horizontal direction. For both ridges 26 the offset is made a distance in the direction towards the groove 20. In this way the seal area will be larger in a direction towards the inner of the package, which seal area acts as an aseptically tight joint, than towards the cut end, in which end the seal area only has to act as a mechanical joint.

Optionally, one or more inserts 28 made of magnetic flux-concentrating material, e.g. a composite material comprising ferrite, are arranged inside the supporting body 22, close to the inductor 12. The insert 28 provides an increase of the magnetic field generated upon activation of the induction sealing device 10, whereby less current is needed for achieving a sufficient sealing of the package.

The magnetic insert 28 may extend along the entire length of the inductor 12, or it may be provided as isolated members distributed at various positions along the length of the inductor 12. Preferably, such isolated magnetic inserts 28 may be arranged at the ends of the sealing surfaces 12a, 12b of the inductor 12, as well as at the center of the inductor 12. The end positions are advantageous in that additional power may be required where the packaging material is folded. Moreover, a centrally positioned magnetic insert 28 may provide additional power to the area where the longitudinal seal of the package is present, thus requiring heat to transfer through an additional layer of packaging material.

Preferably, the magnetic insert(s) 28 are provided with rounded corners as is evident from FIG. 3. This is advantageous in that the polymeric body 22 will be surrounding the insert(s) in a very robust manner, reducing the risk of trapped holes or cracks which may be present in case of sharp corners of the magnetic insert.

The inductor 12 is made of an alloy comprising Ag and Cu as described herein above and in the accompanying claims.

It is apparent to a person skilled in the art that with the advancement of technology, the basic idea may be implemented in various ways. The invention and its embodiments are thus not limited to the examples described above; instead they may vary within the scope of the claims.

The invention claimed is:

1. Induction sealing device for heat sealing packaging material for producing sealed packages, comprising a supporting body possessing an outer surface and at least one inductor made of an alloy comprising silver (Ag) and copper (Cu), the at least one inductor comprising a pair of spaced apart sealing surfaces exposed at the outer surface of the supporting body to produce two parallel and spaced apart seals in the packaging material, the pair of spaced apart sealing surfaces being connected to one another by a loop, the pair of spaced apart sealing surfaces being made of the alloy so that the alloy directly contacts the packaging material during the heat sealing.

2. The induction sealing device according to claim 1, wherein the alloy comprises Ag, Cu and one or more other elements.

3. The induction sealing device according to claim 2, wherein the one or more other elements is/are independently of each other selected from the group consisting of Li, Be, Na, Mg, Al, K, Ca, Sc, Ti, V, Cr, Mn, Fe, Co, Ni, Zn, Ga, Rb, Sr, Y, Zr, Nb, Mo, Tc, Ru, Rh, Pd, Cd, In, Sn, Cs, Ba, Hf, Ta, W, Re, Os, Ir, Pt, Au, Hg, Tl, Pb, Bi, Fr, Ra, Rf, Db, Sg, Bh, Hs, Mt, Ds, Rg, Cn, Uut, Uuq, Uup, and Uuh.

4. The induction sealing device according to claim 3, wherein the one or more other elements is/are independently of each other selected from the group consisting of Ni, Fe, Au, Cr, Be, Zr and Pt.

5. The induction sealing device according to claim 1, wherein the alloy comprises at least 0.1weight % of one or more other element selected from group consisting of Li, Be, Na, Mg, Al, K, Ca, Sc, Ti, V, Cr, Mn, Fe, Co, Ni, Zn, Ga, Rb, Sr, Y, Zr, Nb, Mo, Tc, Ru, Rh, Pd, Cd, In, Sn, Cs, Ba, Hf, Ta, W, Re, Os, Ir, Pt, Au, Hg, Tl, Pb, Bi, Fr, Ra, Rf, Db, Sg, Bh, Hs, Mt, Ds, Rg, Cn, Uut, Uuq, Uup, and Uuh.

6. The induction sealing device according to claim 5, wherein the one or more other element is selected from nickel (Ni), iron (Fe) and gold (Au).

7. The induction sealing device according to claim 1, wherein the alloy comprises 72-78weight % Ag, 21-27weight % Cu and 0.5-2weight % Ni.

8. The induction sealing device according to claim 7 wherein the alloy comprises about 74weight % Ag, about 24weight % Cu and about 1weight % Ni.

9. The induction sealing device according to claim 1, wherein the alloy comprises at least 10weight % Ag, and at least 1weight % Cu.

10. The induction sealing device according to claim 1, wherein the alloy comprises at least 50weight % Ag.

11. The induction sealing device according to claim 1, wherein the alloy comprises at least 20weight % Cu.

12. The induction sealing device according to claim 1, wherein the alloy comprises at least 50weight % Cu.

13. The induction sealing device according to claim 1, wherein the alloy comprises between 50-97weight % Ag, and 3-50weight % Cu.

14. Induction sealing device according to claim 1, wherein at least one inductor is at least partly encapsulated in a supporting body comprising a polymeric material.

15. Induction sealing device according to claim 1, wherein at least one sealing surface of the pair of spaced apart sealing surfaces is provided with a protruding ridge extending along a longitudinal extension of the sealing surface for cooperation with the packaging material and for increasing the sealing pressure on the packaging material during sealing.

16. Induction sealing device cooperable with a counter-sealing element to heat seal tubular packaging material and produce sealed packages, the induction sealing device comprising:
a supporting body possessing an outer facing;
an inductor mounted in the supporting body, the inductor being made of an alloy comprising silver and copper;
the inductor which is made of the alloy comprising silver and copper comprising a pair of spaced apart sealing surfaces exposed at the outer surface of the supporting body to produce two parallel and spaced apart seals in the tubular packaging material.

17. Induction sealing device according to claim 16, wherein each of the sealing surfaces includes a protruding ridge extending along a longitudinal extent of the sealing surface, the protruding ridge at each sealing surface protruding away from the supporting body relative to an adjacent portion of the sealing surface that is exposed at the outer surface supporting body.

18. Induction sealing device according to claim 16, wherein the spaced apart sealing surfaces are parallel to one another, and further comprising a groove in the outer surface of the supporting body for receiving a cutting tool to cut the tubular packaging material which has been sealed by the seal surfaces.

19. Method of manufacturing an induction sealing device for heat sealing packaging material for producing sealed packages, by providing an induction sealing device comprising at least one inductor extending in a longitudinal direction, made of an alloy comprising silver (Ag) and copper (Cu),
the method further comprising:
forming the at least one inductor to possess two sealing surfaces extending in the longitudinal direction parallel to one another;
forming a protruding ridge extending along a longitudinal extension of each of the two sealing surfaces for cooperation with the packaging material and for increasing the sealing pressure on the packaging material during sealing; and
the two sealing surfaces and the protruding ridge of the two sealing surfaces being formed from the alloy which consists of 72-78weight % Ag, 21-27weight % Cu and 0.5-2weight % Ni.

* * * * *